Aug. 5, 1969  M. I. KANTOR  3,459,467

ELECTRONICALLY CONTROLLED INTERFERENCE FILTER

Filed Aug. 10, 1964

INVENTOR
MISHA I. KANTOR

BY Huntz & Rose
ATTORNEYS

United States Patent Office 3,459,467
Patented Aug. 5, 1969

3,459,467
**ELECTRONICALLY CONTROLLED INTER-
FERENCE FILTER**
Misha I. Kantor, Orlando, Fla., assignor to Radiation,
Incorporated, Melbourne, Fla., a corporation of Florida
Filed Aug. 10, 1964, Ser. No. 388,650
Int. Cl. G02b 5/28
U.S. Cl. 350—163
7 Claims

ABSTRACT OF THE DISCLOSURE

An electronically-controlled interference filter responsive to light of wavelength $\lambda$ has an open-ended housing in which a pair of crystals are longitudinally aligned and bonded to the housing to provide a gap between their opposing parallel end faces equal to an odd number of quarter wavelengths $\lambda$. At least one of the crystals is piezoelectric and is bonded to the housing only at the crystal end opposite the gap so that its length may be varied upon application of a voltage thereto independently of the housing, and thereby vary the gap length to control the transmission of light therethrough. Both crystals and the housing have the same coefficient of thermal expansion to render the gap length insensitive to ambient temperature variations, so that passage or blockage of light is independent of temperature. A display panel is composed of a plurality of such filters arranged in a grid-like array of rows and columns, with appropriate selective control of voltage application to each filter.

---

The present invention relates generally to display systems and more particularly to a display system employing a light valve wherein a piezo-electric crystal is selectively energized to control interference fringes.

For many years, cathode ray tubes have been a primary source of high speed displays, particularly displays derived from electronically processed data. Cathode ray tube displays, however, have had numerous drawbacks in their operation: notably, size limitations, parallax in viewing, and inability to derive considerable light therefrom. While numerous light valve techniques have been attempted, none, to my knowledge, has met with acceptance to any great extent.

According to the present invention, there is provided a new and improved display device wherein light from a well collimated, monochromatic source is selectively gated through an interference filter to a display surface. The filter comprises a Fabry-Perot etalon interferometer wherein a pair of parallel, substantially reflecting and partially transparent surfaces is provided. One of the surfaces is a highly polished end of a piezo-electric crystal, that has its length varied in response to the voltage applied transversely thereto. The crystal length is varied in a manner whereby the distance separating the two reflecting surfaces is selectively $$(n+1)\frac{\lambda}{4} \text{ or } n\frac{\lambda}{2}$$

where $n$ is any positive integer in the first instance and any integer, including zero, in the second instance, and $\lambda$ is the wavelength of the monochromatic source. When the reflecting surfaces are an odd multiple of a quarter wave length apart, as indicated by the first expression, the light waves reflecting from the parallel surfaces interfere with each other, and total light deriving from the valve is effectively zero. In contrast, when the reflecting surfaces are a multiple of a half wave length apart, the reflected waves are of like phase, and substantial light is derived from the system. In consequence, the light valve is theoretically capable of transmitting or not transmitting substantial amounts of light, depending upon separation of the two reflecting surfaces. Since the voltage necessary to translate the piezo-electric element reflecting surface is quite small and the capacitance between the electrodes is not excessive, the system can be operated at very high speeds.

As a display system, a multiplicity of light filters or gates of the type described are assembled in an array. The various positions of the array are scanned in response to stepping voltages so that a raster effect is obtained. Selective energization of the various elemeents in the display is effected to open and close each of the light valves to form desired indicia or other information that is to be displayed. In the display system, each of the light paths in the various valves or cells is isolated, one from another, to present discrete spot images on the display face.

While others have proposed devices that would theoretically function in accordance with the principles outlined in the preceding paragraphs, no one, to my knowledge, has been able to successfully produce a practical device. The problem encountered resides in the thermal expansion properties of piezo-electric crystals. In response to temperature variations, the length of each crystal changes considerably to affect the valve light transmitting properties independently of applied voltage. For instance, a one degree change in temperature of a Rochelle salt crystal results in expansion along the crystal longitudinal axis by more than one quarter wave length.

I have found, through experimentation, that this problem can be resolved by encapsulating each valve, including the crystal and the partially reflecting, stationary surface in a housing having substantially the same coefficient of thermal expansion as the crystal and the stationary surface. Thereby, expansion of the crystal and the member carrying the stationary surface along their transverse and longitudinal axes in response to temperature changes is not reflected into changes between the crystal reflecting surface and the adjacent, stationary reflecting surface. These surfaces do not move relatively to each other because expansion of the housing, the crystals, and the reflecting member, the latter two being bonded to the housing, occurs at the end of the housing and one end of each reflecting element, not in the center of the housing nor at the ends of the reflecting members at the housing center.

In a preferred embodiment of the invention, I have found that a Rochelle salt crystal has substantially the same expansion characteristics as an encapsulating housing having a mixture of 75% copper and 25% tin.

According to another feature of the invention, the second or immovable reflecting surface comprises the polished face of a second piezo-electric crystal having the same thermal expansion characteristics as the first crystal. Thereby, problems associated with finding a partially reflecting member having the same thermal expansion properties as the excited crystal and the housing are obviated.

Great linearity and resolution are obtained with the present system because the need for sawtooth generators present in CRT displays is obviated. Also, the amount of light deriving from each cell area is great enough to enable a viewer in the rear of an auditorium to see the entire image being derived. Another advantage of the present invention is that it enables any picture, print font or symbol to be displayed. This is because the present system can provide two adjacent, very small areas, having great light contrast, i.e. a completely dark area can be located adjacently to a very bright area.

It is acordingly, an object of the present invention to provide a new and improved light valve embodying interferometer techniques.

Another object of the present invention is to provide a new and improved light valve capable of being switched from a completely light passing to an almost completely light blocking condition in a very short period.

A further object of the present invention is to provide a new and improved electronically controlled light valve wherein a reflecting surface is translated in response to a low voltage signal.

It is a further object of the present invention to provide a new and improved system for displaying information on a very large display area.

Still a further object of the invention is to provide a display device having good image resolution, high light output and good linearity in reproduction from information applied thereto.

Yet still a further object of the present invention is to provide a system for displaying information on a large screen without limit to the type of information being displayed as long as it is black or white.

Yet an additional object of the present invention is to provide a large area display capable of being scanned rapidly, wherein parallax and light intensity problems usually associated with prior art display devices are obviated.

Another object is to provide a light modulating cell employing a piezo-electric crystal in a Fabry Perot interferometer wherein optical transmitting properties of the cell are not greatly effected by temperature.

Still another object of the invention is to provide a light modulating cell having an opaque housing with substantially the same thermal expansion coefficient as a piezo-electric crystal interferometer element located therein.

The above and still further objects, features and advantages of the present invention will become apparent upon consideration of the following detailed description of one specific embodiment thereof, especially when taken in conjunction with the accompanying drawings, wherein.

Figure 1:
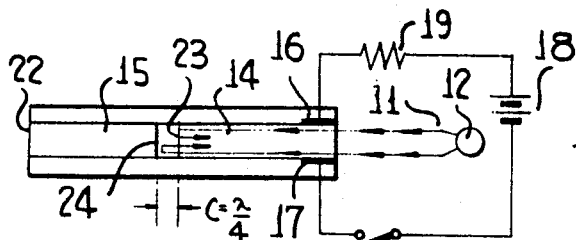
FIGURE 1 is a schematic diagram illustrating the principle of the present invention.
Figure 2:
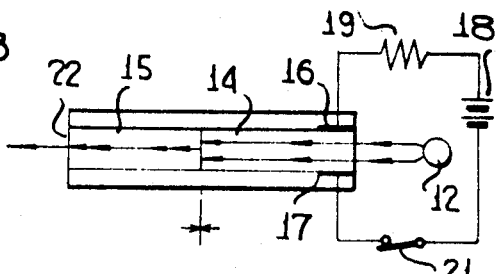
FIGURE 2 is a schematic diagram further illustrating the principle of the present invention.

Reference is now made to FIGURES 1 and 2 of the drawings wherein the reference numeral 11 represents a well collimated, monochromatic beam of light transmitted from source 12 onto transparent face 13 of piezo-electric crystal 14. Having its longitudinal axis aligned with the longitudinal axis of crystal 14 is crystal 15, preferably fabricated from the same material as crystal 14. Polished, highly reflective, semi-transparent, parallel adjacent surfaces 23 and 24, transverse to the longitudinal axis of crystals 14 and 15 are separated by an air gap of an odd multiple of a quarter wave length of the waves deriving from source 12.

Electrodes 16 and 17 are connected across the opposite longitudinal sides of crystal 14. These electrodes are selectively connected to DC source 18 via current limiting resistor 19 and normally open switch 21. Because light beams 11 impinge at right angles on face 13 of crystal 14 and crystals 14 and 15, both of which are transparent and are preferably of Rochelle salt, and faces 23 and 24 are substantially reflecting, all the light in the gap between crystals 14 and 15 is effectively cancelled. In consequence, no light derives from face 22 of crystal 15 and the light from source 12 may be considered as blocked.

Considerable wave interference occurs to prevent transmission of light through crystal 15 because the wave energy reflected from face 23 of crystal 14 is displaced 180° from the energy reflected from face 24 of crystal 15. The 180° displacement occurs because there is a total one-half wavelength path that light deriving from face 23 undergoes in the quarter wave length gap between faces 23 and 24. Since the light reflected from face 24 is 180° out of phase relative to the light reflected from face 23, the two reflective wave energies effectively cancel to substantially prevent light energy from being propagated through crystal 15. This interference effect is well known and is generally utilized in a Fabry-Perot interferometer in accordance with the equation $n\lambda = 2d \cos \theta$ where:

$\theta$ is the angle between the longitudinal axis of crystal 14 and light beam 11

$d$ is the gap between faces 23 and 24

$\lambda$ = the wavelength of light ray 11 and $n$ is any positive integer.

When switch 21 is closed, as is shown in FIGURE 2, the length of crystal 14 is increased by one quarter the wavelength of the waves in beam 11 so that adjacent faces 23 and 24 of crystals 14 and 15 coincide. Thereby, the gap between crystals 14 and 15 is zero and substantially no interference occurs between the reflected waves. Light waves deriving from partially transparent (about 15%) faces 23 and 24 are in phase, hence add so that considerable light is derived from face 22 of crystal 15.

It is to be understood that the principles of the present invention are applicable even if the adjacent faces 23 and 24 of crystals 14 and 15 are not touching. The filter arrangement comprising crystals 14 and 15 will pass light beams 11 as long as the distance between the adjacent faces is $n\lambda/2$ where $n$ is any positive integer, as well as zero. No interference occurs under these circumstances because the waves reflected from faces 23 and 24 are always of like phase so that cancellation thereof does not occur within crystal 14.

Figure 3:
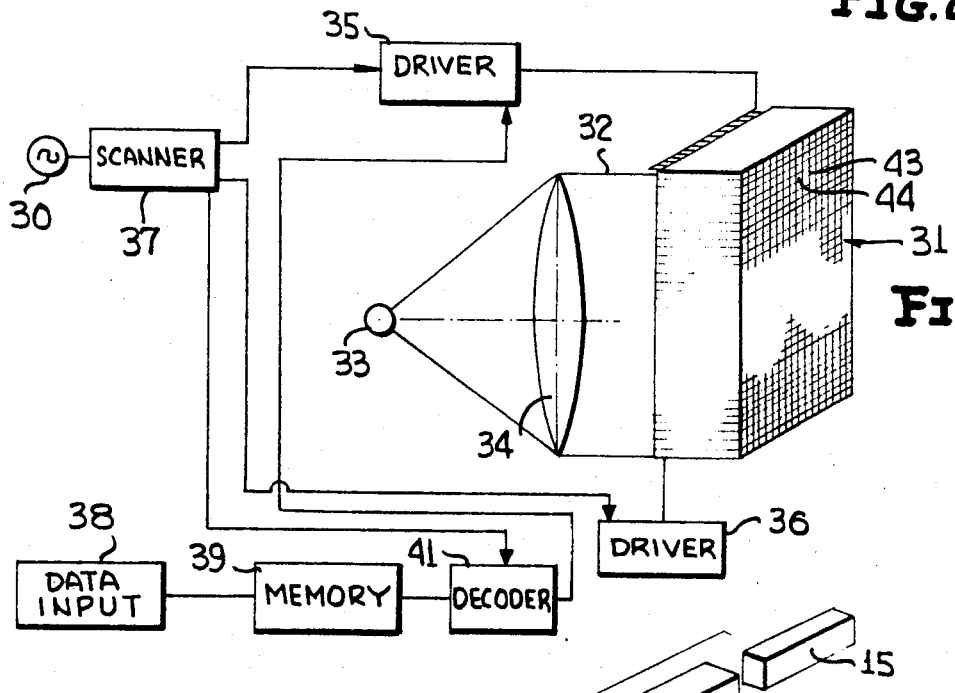
FIGURE 3 is a semi-block diagram wherein a complete assembly of a preferred embodiment of the invention is illustrated.

Reference is now made to FIGURE 3 of the drawings wherein there is disclosed the manner whereby a multiplicity of light valves illustrated in FIGURES 1 and 2 are assembled together to provide a large black and white display area 31. Display area 31 is composed of hundreds or thousands of valves such as illustrated in FIGURES 1 and 2, wherein 256 such valves are provided per square inch, i.e. 16 valves per linear inch. The back surface of display 31 is illuminated by monochromatic, collimated beams of light 32 deriving from source 33 and lens 34.

The valves comprising display 31 are arranged in rows and columns with the electrodes 16, 17 of each valve being activated sequentially via drivers 35 and 36. Drivers 35 and 36 are driven by scanner 37 and 38 to provide a raster across the face of display area 31. Each of the drivers 35 and 36 includes a multiplicity of outputs, one of each of the columns and rows, respectively, of display area 31. In effect, each of drivers 35 and 36 is a commutator, for stepping the position that a light beam may be derived at the surface of display 31. In operation driver 36 supplies its output voltage to all of electrodes 17 in each row of display 31 while driver 35 steps its output across each of electrodes 16 in the selected row. After the selected row has been scanned by the output of driver 35, the output of driver 36 is stepped to the next row and the signal deriving from driver 35 is sequenced across each of electrodes 16 in that row. In this manner, the entire display area is scanned by the operation of drivers 35, 36 and scanner 37 at a speed to provide persistence of vision to a human viewer, i.e. display surface 31 is scanned at a rate of at least 16 cycles per second.

To control the image deriving from surface 31, a data input signal is applied by input device 38 to memory 39 that feeds decoder 41. Memory 39 and decoder 41 are necessary because input data is usually of a different speed than the raster that drives display 31 and because the data is in a different form than the indicia displayed on surface 31. The signal deriving from decoder 41 determines if an output is derived from driver 35 for the particular location that drivers 35 and 36 are sequenced to on surface 31. Thus, if spot 43 is illuminated when drivers 35 and 36 have their output leads sequenced to activate this spot, a voltage is applied by decoder 41 to the approximate lead deriving from driver 45. This causes voltage to be applied between electrodes 16 and 17 of the selected valve 43 so that a high intensity light beam derives from it. Cell 44, adjacent to cell 43, is dark for the particular character of information derived displayed on surface 31. No voltage is applied by decoder 41 to driver 35 when that driver is stepped to its next position. Because no voltage is applied to electrodes 16, 17 of cell 44, that cell remains dark in comparison with the amount of light deriving from valve or cell 43.

Figure 4:
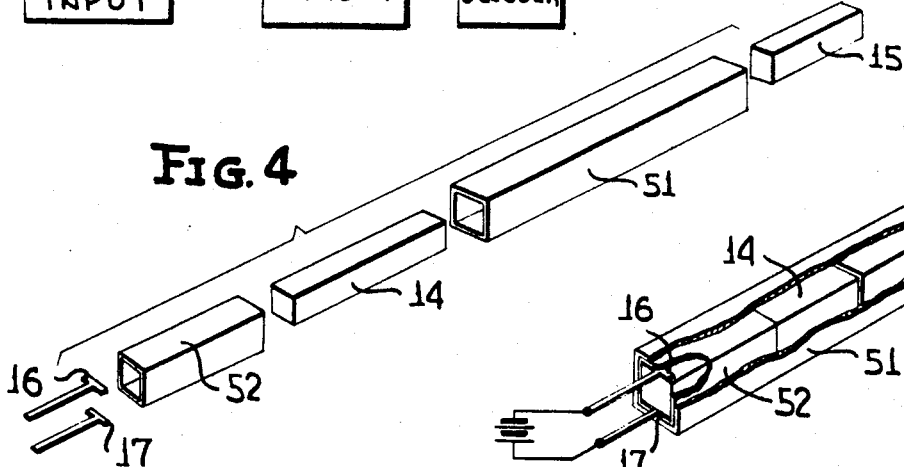
FIGURE 4 is an exploded view of a single interference filter element of FIGURE 3.
Figure 5:
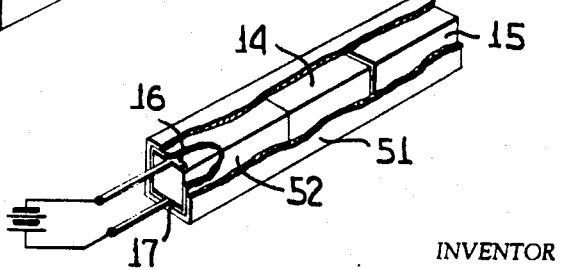
FIGURE 5 is a perspective view of the apparatus illustrated in FIGURE 4 when it is completely assembled with a section of the exterior sleeve removed.

Reference is now made to FIGURES 4 and 5 of the drawing, respectively illustrating exploded and assembled views of a single filter element according to the present invention. Each filter assembly includes hollow, opaque housing 51, approximately 1/16" x 1/16" x 3/4" with walls 0.010" thick, and fabricated from a material having approximately the same coefficient of thermal expansion as crystals 14 and 15; in the case of crystals 14 and 15 being Rochelle salt, housing 51 is an alloy mixture of approximately 75% copper and 25% tin. Bonded to the interior walls of housing 51 at the left side thereof, is viewed in the figures, is electrically insulating, Teflon sleeve 52, having a length of approximately one half of the 1/2" length of translated crystal 14. Sleeve 52 is preferably vapor deposited on the interior walls of housing 51. Bonded to the exterior edges of the interior 0.0001 thick walls of sleeve 52 is crystal 14, that has a length on each of its faces of 0.0498". Very thin (0.002" thick) contacts 16 and 17 are bonded to opposite longitudinal walls of crystal 14 by epoxy cement or they can be formed by vapor deposition techniques. Bonded to the edges of the interior walls of housing 51 at the end opposite crystal 14 is stationary crystal 15 that is approximately 1/4" long and 0.050" on a side so that its side walls contact the interior sleeve walls.

During assembly, crystals 14 and 15 are inserted in housing 51 so adjacent, parallel, highly polished substantially reflecting surfaces 23 and 24 are separated from each other by an air gap of λ/4 when crystal 52 is not energized with D.C. potential. With a voltage of about 10 volts, equal to the operating potential of the FIGURE 3 system, applied between electrodes 16, 17, the length of crystal 14 is extended so adjacent crystal faces 23 and 24 are brought into contact. Crystal 14 is then bonded in place to the interior walls of housing 51 and sleeve 52. After the voltage applied to electrodes 16, 17 is reduced to zero, the position of crystal 15 is then mechanically translated so that faces 23 and 24 are separated by λ/4. The quarter wave length separation is determined by shining a collimated beam of monochromatic light onto face 13 and observing the position of crystal 15 when no light derives from face 22. Crystal 15 is cemented into place at the observed position.

Because crystals 14 and 15 have the same thermal expansion coefficient as housing 51, temperature changes have no substantial effect on the relative positions of faces 23 and 24; hence on the interference properties of the waves reflected and passing through these faces. For increasing temperatures the exterior edges of crystals 14 and 15 move away from each other with the opposed faces of container 51. Simultaneously, adjacent crystal faces 23 and 24 move towards each other since the crystals are fixed to container 51 only at their exterior faces opposite from faces 23 and 24. The movement of faces 23 and 24 towards each other is compensated by expansion of crystals 14 and 15 and container 51 in the opposite directions. Of course, the opaque character of housing 51 also prevents interaction of the light beams passing through adjacent cells so adjacent display areas can have great light contrast differences.

While I have described and illustrated one specific embodiment of my invention, it will be clear that variations of the details of construction which are specifically illustrated and described may be resorted to without departing from the true spirit and scope of the invention as defined in the appended claims.

I claim:
1. An electronically-controlled interference filter responsive to monochromatic light of wavelength λ, said filter comprising:
   a piezo-electric crystal having a longitudinal axis and having first and second faces perpendicular to said axis and separated by the length of said crystal,
   an open-ended opaque housing of greater length than said crystal,
   said crystal disposed within said housing with its longitudinal sides encompassed thereby and with its first face exposed at one open end thereof for incidence of said light thereon,
   a light-transmissive body having a longitudinal axis and having a semi-transparent, partially reflecting surface and a further face perpendicular to its axis and separated by the length of said body,
   said body disposed within said housing with its longitudinal axis aligned with the longitudinal axis of said crystal, and with said surface adjacent the second face of said crystal and in light exchange relationship therewith,
   said crystal, said housing, and said body having substantially the same coefficient of thermal expansion,
   said crystal bonded to said housing only at said one open end thereof, and said body bonded to said housing with said partially reflecting surface of said body spaced from said second face of said crystal by an integral number of quarter wavelengths λ, and
   means for applying an electric field to said crystal to proportionally change the length thereof and thereby vary the gap between said surface and said second face, to produce a change in the light transmissive property of said filter from a condition of blockage to a condition of passage of said incident light, independently of ambient temperature variations.

2. The electro-optical filter according to claim 1, wherein:
   said light-transmissive body is a piezo-electric crystal of the same composition as the first-named crystal.

3. An electro-optical display system, comprising:
   a display panel including a plurality of electro-optical cells, each constituting an electronically-controlled interference filter according to claim 1,
   said cells arranged in a grid array of rows and columns with said further face of said light-transmissive body of each cell exposed at a common side of said panel for viewing an image to be presented thereon, and
   means for selectively controlling said electric field applying means of each cell, and thereby the passage of light through each cell, to produce a desired image on said panel.

4. The display system according to claim 3, wherein:
   said light-transmissive body of each cell is a piezo-electric crystal of the same composition as the first-named crystal.

5. A light valve, comprising:
   a pair of light transparent, piezo-electric crystals having coincident longitudinal axes and parallel, adjacent, semi-transparent, partially reflecting faces normal to the longitudinal axis and separated by a predetermined distance substantially equal to an odd multiple of a quarter wavelength of visible light to which said valve is to be responsive,
   an opaque housing having a pair of open ends, the longitudinal sides of said crystals being surrounded by the interior walls of said housing and bonded thereto, one of said crystals bonded only to the respective one of said ends of said housing to normally maintain said predetermined separation distance between said faces, while permitting axial expansion of said one of said crystals independently of said housing, said crystals and housing all having substantially the same coefficient of thermal expansion to render said independent axial expansion insensitive to ambient temperature variations, and means for selectively applying a voltage to said one of said crystals to vary the distance between said faces, whereby to interferometrically control the passage of light through said housing via said adjacent faces of said crystals.

6. An electrically controlled light filter, comprising:

first and second light transmissive crystals aligned along a common longitudinal axis, said crystals having opposing partially transparent, partially reflecting end faces perpendicular to said axis and normally separated by a distance equal to a multiple of a quarter wavelength of light to which said filter is to be responsive, an open ended opaque housing encompassing the longitudinal sides of said first and second crystals to permit passage or blockage of light longitudinally through said crystals in accordance with the distance between said opposing faces, said housing and said crystals having substantially the same coefficient of thermal expansion and being fastened together to render the distance between said opposing faces substantially insensitive to ambient temperature variations, one of said crystals being piezo-electric, and means for applying a voltage to said piezo-electric crystal to vary the length thereof, and thereby, the distance between said opposing faces, said piezo-electric crystal being fastened to said housing only at the respective open end thereof to permit said variation of length thereof independently of said housing.

7. A controlled light valve, comprising:

an open-ended opaque housing having a longitudinal axis, a pair of crystals aligned within and fastened to said housing, and sharing said axis therewith, with adjacent end faces of said crystals normally separated by a longitudinal gap equal to a multiple of a quarter wavelength of the light to which said valve is responsive, said end faces being partially reflecting and partially transparent, one of said crystals being piezo-electric, and means for applying electrical signal to said piezo-electric crystal to vary the length of said gap and thereby the light transmissive qualities of said valve, said piezo-electric crystal being fastened only to one end of said housing to permit variation of said gap length, said housing and said pair of crystals composed of materials having substantially the same coefficient of thermal expansion whereby the length of said gap is relatively independent of temperature variations in the immediate vicinity of said housing and said crystals.

References Cited

UNITED STATES PATENTS 2,467,325 4/1949 Mason _____ 350—150
3,202,052 8/1965 Rambauske et al. ____ 350—163

FOREIGN PATENTS 461,138 11/1949 Canada.

RONALD L. WIBERT, Primary Examiner

V. P. McGRAW, Assistant Examiner

U.S. Cl. X.R.

356—112